US012692735B2

(12) United States Patent
Qiu

(10) Patent No.: US 12,692,735 B2
(45) Date of Patent: Jul. 28, 2026

(54) DOOR LOCK FOR PET CRATE

(71) Applicant: JIANGSU ZHONGHENG PET ARTICLES JOINT-STOCK CO., LTD., Yancheng (CN)

(72) Inventor: Bin Qiu, Yancheng (CN)

(73) Assignee: JIANGSU ZHONGHENG PET ARTICLES JOINT-STOCK CO., LTD., Yancheng (CN)

( * ) Notice: Subject to any disclaimer, the term of this patent is extended or adjusted under 35 U.S.C. 154(b) by 1 day.

(21) Appl. No.: 19/026,560

(22) Filed: Jan. 17, 2025

(65) Prior Publication Data

US 2026/0085557 A1     Mar. 26, 2026

(30) Foreign Application Priority Data

Sep. 24, 2024    (CN) .......................... 202422330999.8

(51) Int. Cl.
| | |
|---|---|
| *E05C 5/02* | (2006.01) |
| *A01K 1/03* | (2006.01) |
| *E05C 19/00* | (2006.01) |

(52) U.S. Cl.
CPC ................ E05C 5/02 (2013.01); A01K 1/034 (2013.01); E05C 19/006 (2013.01)

(58) Field of Classification Search
CPC .......... A01K 1/034; E05C 5/02; E05C 19/006
See application file for complete search history.

(56) References Cited

U.S. PATENT DOCUMENTS

| | | | | |
|---|---|---|---|---|
| 6,192,834 | B1 * | 2/2001 | Kolozsvari ............ | A01K 31/08 |
| | | | | 119/474 |
| 6,681,720 | B1 * | 1/2004 | Skurdalsvold ......... | A01K 1/034 |
| | | | | 119/462 |
| 7,918,188 | B1 * | 4/2011 | Harper ..................... | A01K 1/03 |
| | | | | 119/481 |
| D784,630 | S  * | 4/2017 | Cantwell ..................... | D30/119 |
| 10,660,303 | B2 * | 5/2020 | Volin ..................... | A01K 1/034 |
| 10,716,284 | B2 * | 7/2020 | Link ..................... | A01K 1/034 |
| 2016/0138322 | A1 * | 5/2016 | Link ........................ | E05D 15/56 |
| | | | | 49/394 |
| 2019/0223403 | A1 * | 7/2019 | Veness .................... | A01K 1/034 |
| 2020/0354999 | A1 * | 11/2020 | Cantwell ................... | E06B 3/36 |
| 2021/0227784 | A1 * | 7/2021 | Link ........................ | A01K 1/03 |

* cited by examiner

*Primary Examiner* — Michael H Wang

(74) *Attorney, Agent, or Firm* — Bayramoglu Law Offices LLC

(57) ABSTRACT

A door lock for a pet crate includes: a crate body provided with an opening; a door body including one end rotatably connected to one side of the opening, and a locking assembly provided at the other end of the door body and connected to the crate body. As the door body is rotatably connected to the crate body, and the door body and the crate body are provided with the locking assembly, the door body can be stably fixed to the crate body through the locking assembly to prevent the pet from pulling the door lock left and right to open the door body. In addition, the locking of the door body can be completed simply by rotating the locking assembly and pulling the locking assembly to the right, making the operation simple.

7 Claims, 4 Drawing Sheets

B

101

10

102

DOOR LOCK FOR PET CRATE

CROSS REFERENCE TO THE RELATED APPLICATIONS

This application is based upon and claims priority to Chinese Patent Application No. 202422330999.8, filed on Sep. 24, 2024, the entire contents of which are incorporated herein by reference.

TECHNICAL FIELD

The present disclosure relates to the field of pet products, and in particular to a door lock for a pet crate.

BACKGROUND

With the continuous development of economic globalization, people's living standards have greatly improved and their consumption power has greatly increased. Under the influence of new lifestyles and development trends, more and more people are choosing pets as an important companion for themselves. Keeping pets has many benefits, such as reducing loneliness, increasing sense of security, relieving immense work pressure, and cultivating temperament.

Keeping pets, such as dogs, requires the use of a pet crate. However, the door latch of the door lock used by the existing pet crate is easily opened by clever pets, leading to their escape.

SUMMARY

In order to solve the technical problem that the door latch of the door lock used by the existing pet crate is easily opened by pets, leading to their escape, an objective of the present disclosure is to provide a door lock for a pet crate.

To achieve the above objective, an embodiment of the present disclosure provides a door lock for a pet crate. The door lock for a pet crate includes: a crate body provided with an opening; a door body including one end rotatably connected to one side of the opening; and a locking assembly provided at an other end of the door body and connected to the crate body.

As the door body is rotatably connected to the crate body, and the door body and the crate body are provided with the locking assembly, the door body is stably fixed to the crate body through the locking assembly to prevent the pet from pulling the door lock left and right to open the door body. In addition, the locking of the door body can be completed simply by rotating the locking assembly and pulling the locking assembly to the right, making the operation simple.

In addition, the door lock for a pet crate provided by the above embodiment of the present disclosure may have the following additional technical features.

In the above technical solution, the locking assembly includes: a fixed member, fixedly connected to the door body, where the fixed member is provided with protrusions, and gaps are formed between the protrusions and the door body; a limiting member, fixedly connected to the crate body, where the limiting member is provided at one side of the opening away from a connection between the door body and the crate body; a rotating rod, rotatably connected inside the gaps and the limiting member; and a first locking member, fixedly connected to one end of the rotating rod, where the first locking member is provided at one side of the limiting member away from the fixed member.

By fixedly connecting the fixed member to the door body, providing two protrusions on the fixed member, and constructing the gaps between the protrusions and the door body, the rotating rod can run through the two gaps. In this way, the rotating rod is rotatably connected between the door body and the fixed member, providing support for the rotating rod. By fixedly connecting the limiting member to the crate body and providing the limiting member at the side of the opening away from the connection between the door body and the crate body, when it is necessary to lock the door body, the rotating rod extends into the limiting member to complete the limit of the door body. Meanwhile, one end of the rotating rod is fixedly connected to the first locking member, and the first locking member can be used to lock the door body, further preventing the pet from opening the door body.

In the above technical solution, the door lock for a pet crate further includes: second locking members, fixedly connected to the crate body, where the second locking members are located above and below the opening.

By fixedly connecting the second locking members to the crate body, and providing the second locking members above and below the opening, a limiting effect on the door body can be achieved through the second locking members, thereby further preventing the pet from opening the door body.

In the above technical solution, the first locking member is triangular in shape.

Since the first locking member is constructed as a triangle, when it is necessary to lock the door body, right-angled sides of the triangle cooperate with the limiting member to provide a limiting effect on the door body, preventing the rotating rod from sliding left or right and avoiding the pet from opening the door body. When it is necessary to open the door body, the rotating rod is rotated. The hypotenuse of the first locking member slides along the limiting member, allowing the rotating rod to slide downwards while sliding to the left, relieving the locking effect of the second locking members on the door body.

In the above technical solution, the second locking members each include two U-shaped rods; the two U-shaped rods each include one end fixedly connected inside the crate body and an other end located outside the crate body; and a connecting rod is fixedly connected between the two U-shaped rods outside the crate body.

The two U-shaped rods face downwards and are suspended on a rail of the crate body. The two U-shaped rods each include one end fixedly connected inside the crate body and the other end located outside the crate body. The connecting rod is fixedly connected between the ends of the two U-shaped rods located outside the crate body. Therefore, when the door body is closed, upper and lower ends of the door body are located inside the second locking members above and below, respectively, limiting the door body and stabilizing the door body after closed.

In the above technical solution, a handle is fixedly connected to the rotating rod.

The design of fixedly connecting the handle to the rotating rod makes it easy for an operator to rotate the rotating rod.

In the above technical solution, the limiting member is U-shaped; and two ends of the limiting member are fixedly connected to the crate body.

By constructing the limiting member to have a U-shape, and fixedly connecting the two ends of the limiting member to the crate body, the limiting member and the crate body enclose a space, thus making it easy for the rotating rod to pass through the space and ensuring normal horizontal sliding of the rotating rod.

Additional aspects and advantages of the present disclosure will become apparent in the following description or be understood through the practice of the present disclosure.

BRIEF DESCRIPTION OF THE DRAWINGS

The above and/or additional aspects and advantages of the present disclosure will become apparent and readily comprehensible from the description of embodiments in conjunction with the following drawings.

Figure 1:
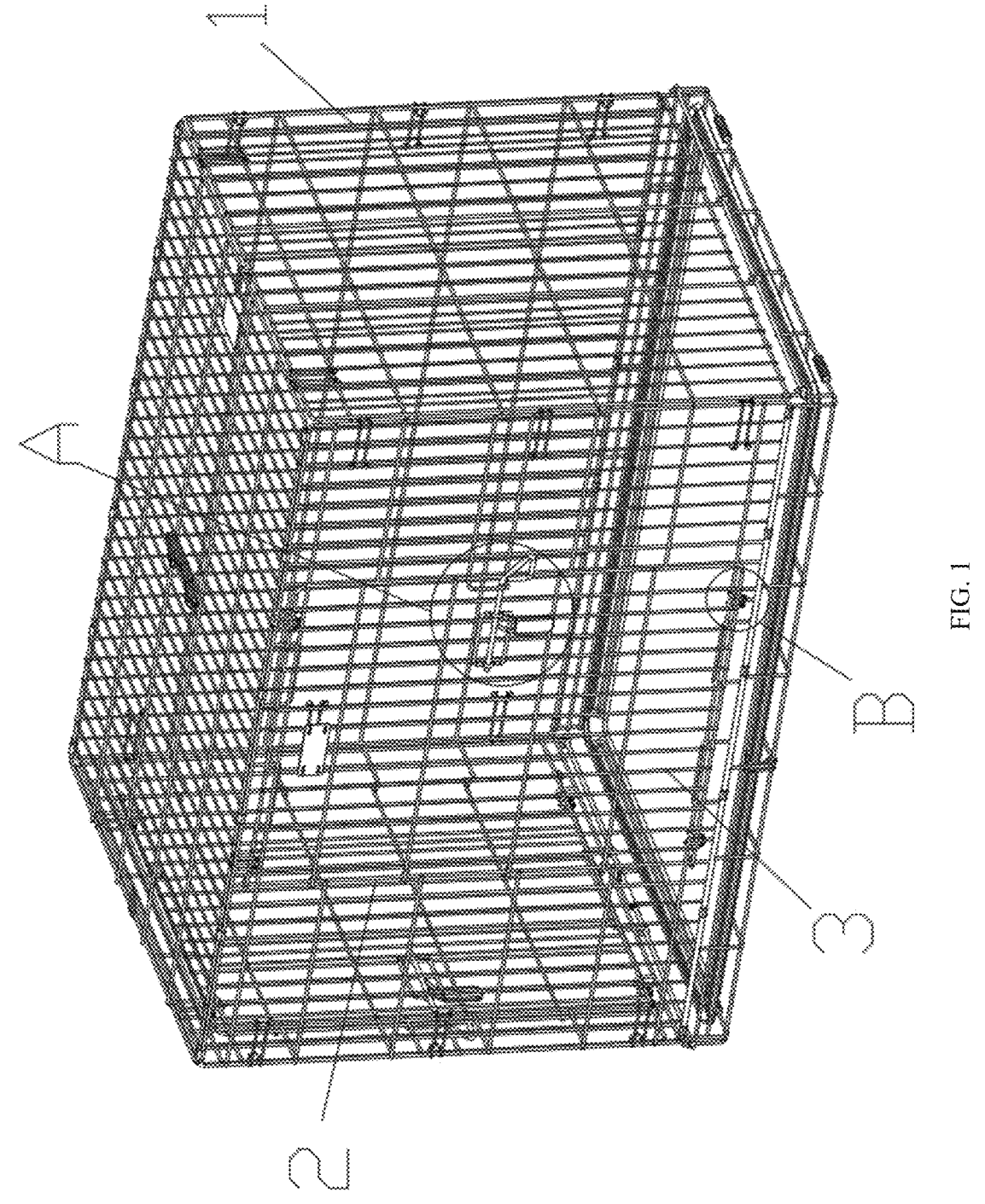
FIG. 1 is a schematic structural diagram of a door lock for a pet crate according to an embodiment of the present disclosure.

Reference numerals in FIGS. 1 to 4 are as follows:
1. crate body; 2. opening; 3. door body; 4. fixed member; 5. protrusion; 6. gap; 7. limiting member; 8. rotating rod, 9. first locking member; 10. second locking member; 101. U-shaped rod; 102. connecting rod; and 11. handle.

DETAILED DESCRIPTION OF THE EMBODIMENTS

To understand the above objectives, features, and advantages of the present disclosure more clearly, the present disclosure is further described in detail below with reference to the drawings and specific implementations. It should be noted that the embodiments of the present disclosure and features of the embodiments may be combined with each other in case of no conflict.

Many specific details are set forth in the following description to facilitate a full understanding of the present disclosure. However, the present disclosure can also be implemented in other ways different from those described herein. Therefore, the protection scope of the present disclosure is not limited by the specific embodiments disclosed below.

A door lock for a pet crate according to some embodiments of the present disclosure is described below according to FIGS. 1 to 4.

As shown in FIGS. 1 to 4, an embodiment of the present disclosure provides a door lock for a pet crate, including a crate body 1, a door body 3, and a locking assembly.

Specifically, the crate body 1 is provided with an opening 2. One end of the door body 3 is rotatably connected to one side of the opening 2. The locking assembly is provided at the other end of the door body 3 and connected to the crate body 1.

In the door lock for a pet crate provided by the embodiment of the present disclosure, to lock the door body 3, the door body 3 with a left end rotatably connected to a left end of the opening 2 is first rotated to the right, such that a right end of the door body 3 rotates to a right end of the opening 2. At this point, the door body 3 and the crate body 1 are in a closed state. Subsequently, an operator pulls the locking assembly to the right and rotates it downwards to secure the door body 3 to the crate body 1. To open the door body 3 again, the locking assembly is first rotated upwards and then pulled to the left. During this process, whether it is necessary to open or lock the door body 3, the locking assembly is rotated and pulled once, making the operation simple. In addition, to open the door body 3, the locking assembly is rotated away from the crate body 1. Since the pet is located inside the crate body 1, it is inconvenient for the pet's hands and feet to push the locking assembly outward, making it impossible for the pet to operate the locking assembly. The design reduces the possibility of the pet escaping from the crate body 1 and prevents the pet from opening the door body 3 to go out.

As shown in FIGS. 1 to 4, in an embodiment of the present disclosure, the locking assembly includes a fixed member, a limiting member, a rotating rod, a first locking member, and second locking members. The fixed member 4 is fixedly connected to the door body 3. The fixed member 4 is provided with protrusions 5. A gap 6 is formed between the protrusion 5 and the door body 3. The limiting member 7 is fixedly connected to the crate body 1. The limiting member 7 is provided at one side of the opening 2 away from a connection between the door body 3 and the crate body 1. The rotating rod 8 is rotatably connected inside the gaps 6 and the limiting member 7. The first locking member 9 is fixedly connected to one end of the rotating rod 8 and provided at one side of the limiting member 7 away from the fixed member 4.

The second locking members 10 are fixedly connected to the crate body 1, and are located above and below the opening 2.

The first locking member 9 is triangular in shape.

The second locking members 10 each include two U-shaped rods 101. The U-shaped rods 101 each include one end fixedly connected inside the crate body and the other end located outside the crate body. A connecting rod 102 is fixedly connected between the U-shaped rods 101 outside the crate body.

The limiting member 7 is U-shaped. Two ends of the limiting member 7 are fixedly connected to the crate body 1.

Firstly, the operator pulls the door body 3 with the left end rotatably connected to the left end of the opening 2 to the right, causing the right end of the door body 3 to rotate to the right end of the opening 2. At this point, the door body 3 completely covers the opening 2, and the crate body 1 is in a closed state.

It should be noted that the left end of the door body 3 is rotatably connected to the crate body 1, and the door body 3 is slidable up and down along the connection between door body 3 and the crate body 1. The fixed member 4 is fixedly connected to one side of the door body 3 away from the crate body 1, and has a hollow structure in a front to back direction. The fixed member 4 is located close to the right end of the door body 3, and central portions of two ends of the fixed member 4 are bent away from the crate body 1 to form the protrusions 5. The gap 6 is formed between the protrusion 5 and the door body 3. The rotating rod 8 passes through the two gaps 6 and is rotatably connected inside the two gaps 6. The rotating rod 8 is slidable left and right inside the gaps 6, and the rotating rod 8 is in an interference fit with the gaps 6. Therefore, in the absence of external force, the rotating rod 8 will not rotate. In addition, a right end of the rotating rod 8 is fixedly connected to the first locking member 9. The first locking member 9 is a right-angled triangle. In an initial state, the left and upper sides of the right-angled triangle are the right-angled sides of the right-angled triangle, and the right side of the first locking member 9 is the hypotenuse of the right-angled triangle. A right side of the opening 2 is provided with the limiting member 7 that is fixedly connected to the crate body 1. The limiting member 7 is U-shaped. The two ends of the limiting member 7 are fixedly connected to the crate body 1, leaving space between the limiting member 7 and the crate body 1. In the initial state, the first locking member 9 is provided at a left side of the limiting member 7, and a lower end of the limiting member 7 is higher than a lower end of the first locking member 9 and lower than an upper end of the first locking member 9.

To lock the door body 3 onto the crate body 1, the rotating rod 8 is pulled to the right until the hypotenuse of the first locking member 9 contacts the lower end of the limiting member 7. Due to the gradual increase in the height of the hypotenuse of the first locking member 9 from left to right, the hypotenuse moves upward along the lower end of the limiting member 7. In addition, the first locking member 9 passes through the space between the limiting member 7 and the crate body 1 until the first locking member 9 moves completely to the right side of the limiting member 7. Then the operator stops pulling the first locking member 9 to the right. During the process of pulling the rotating rod 8 to the right, as the rotating rod 8 is rotatably connected inside the gaps 6, the upward movement of the first locking member 9 drives the rotating rod 8 to move upward. When the rotating rod 8 moves upwards, it drives the fixed member 4 to move upwards. When fixed member 4 moves upwards, it drives the door body 3 to move upwards. The second locking members 10 are fixedly connected to the crate body 1. The second locking members 10 are located on the upper and lower sides of the opening 2. The second locking members 10 each include two U-shaped rods 101 arranged side by side. The U-shaped rod 101 is open downwards and suspended on a rail of the crate body 1. The U-shaped rod 101 includes one end fixedly connected inside the crate body 1 and the other end provided outside the crate body 1. There is a certain distance between the U-shaped rod 101 located outside the crate body 1 and an outer wall of the crate body 1. The length of this distance is greater than the thickness of the door body 3. The connecting rod 102 is fixedly connected between the two U-shaped rods 101 located outside the crate body 1. When the door body 3 is not moved upwards, the second locking member 10 is staggered with the rail on the door body 3 to ensure that the door body 3 can be opened and closed normally. There are horizontal rails at the upper and lower ends of the door body 3. When the door body 3 is moved upward, the rail at the upper end of the door body 3 extends into the space formed by the upper U-shaped rod 101 located outside the crate body 1 and the crate body 1 while the rail at the lower end of the door body 3 extends into the space formed by the lower U-shaped rod 101 located outside the crate body 1 and the crate body 1. In this way, the U-shaped rods 101 have a limiting effect on the door body 3, preventing the door body 3 from being opened. In addition, when the pet tries to pry open the door, the second locking members 10 provide support for the door body 3, preventing all the impact force generated by the pet from acting on the limiting member 7 and the rotating rod 8. The second locking members 10 play a role in dispersing the impact force and reducing damage to the rotating rod 8 and the limiting member 7. Meanwhile, the U-shaped rods 101 and the connecting rod 102 are integrally formed to improve the structural strength of the entire second locking member 10. When the first locking member 9 fully passes through the limiting member 7 and reaches the right side of the limiting member 7, the rotating rod 8 is rotated downwards to rotate the first locking member 9 for 180 degrees. At this point, the right-angled sides of the first locking member 9 are located on the left and lower sides, and the left side of the first locking member 9 is located below the limiting member 7. Thus, the second locking member 10 cannot be displaced to the left. At this point, through the joint action of the first locking member 9 and the second locking members 10, the door body 3 is completely locked onto the crate body 1.

To open the door body 3, the operator only needs to rotate the first locking member 9 upwards and pull the rotating rod 8 to the left. The hypotenuse of the locking member slides along the limiting member 7, causing the door body 3 to gradually move downwards. The second locking member 10 is staggered with the rail of the door body 3, thereby opening the door body 3 normally.

In the above process, whether to open or lock the door body 3, the rotating rod 8 is rotated and pulled only once, making the operation simple. When the door body 3 is locked with the first locking member 9, if it is necessary to open the door body 3, the rotating rod 8 and the first locking member 9 are rotated upwards, and then the first locking member 9 is pulled to the left. The pet is located inside the crate body 1 and it is hard for the pet to rotate the rotating rod 8 for 180 degrees upwards, thereby preventing the pet from escaping the crate body 1.

Figure 2:
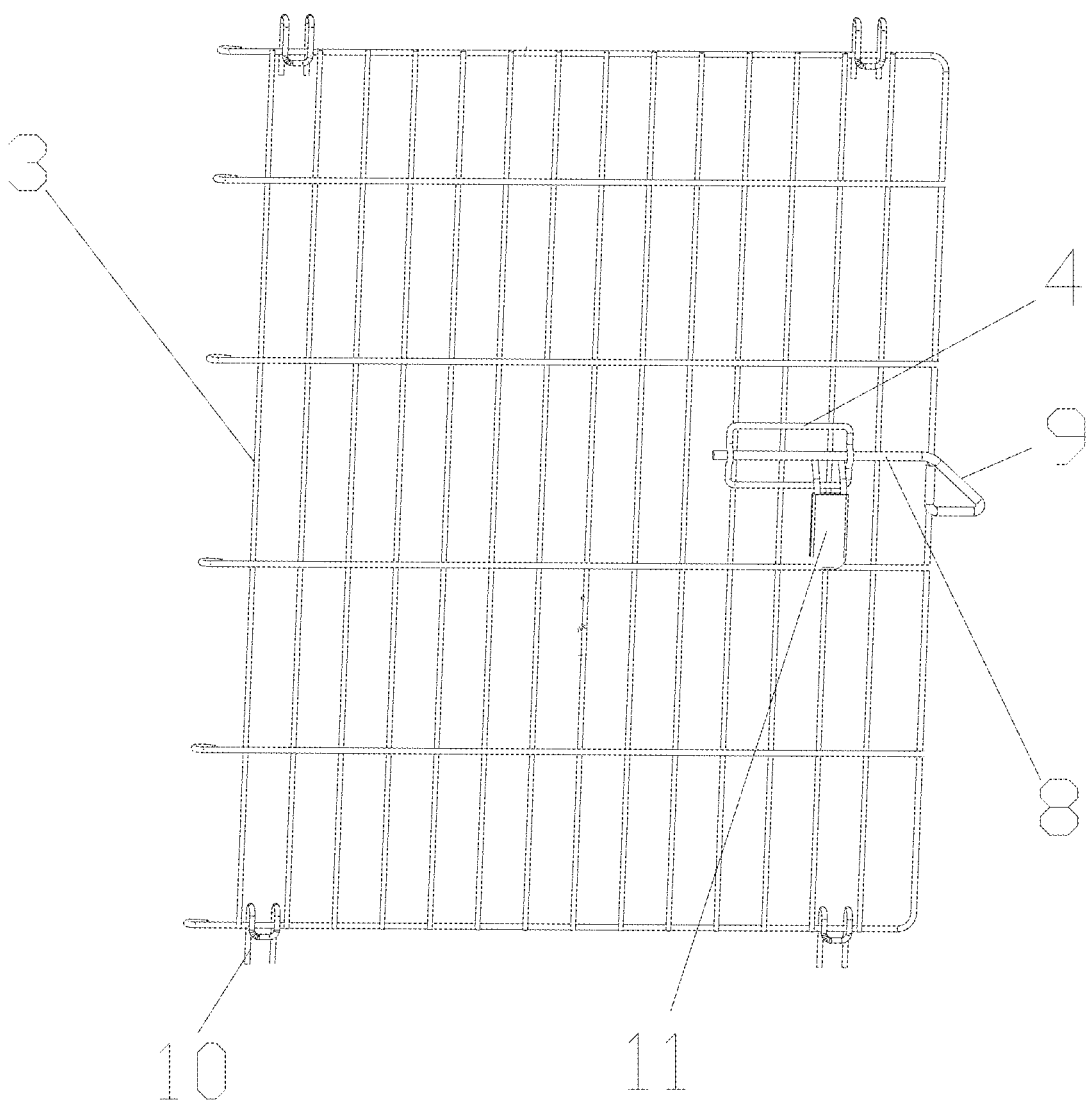
FIG. 2 is a schematic structural diagram of a door body according to an embodiment of the present disclosure.
Figure 3:
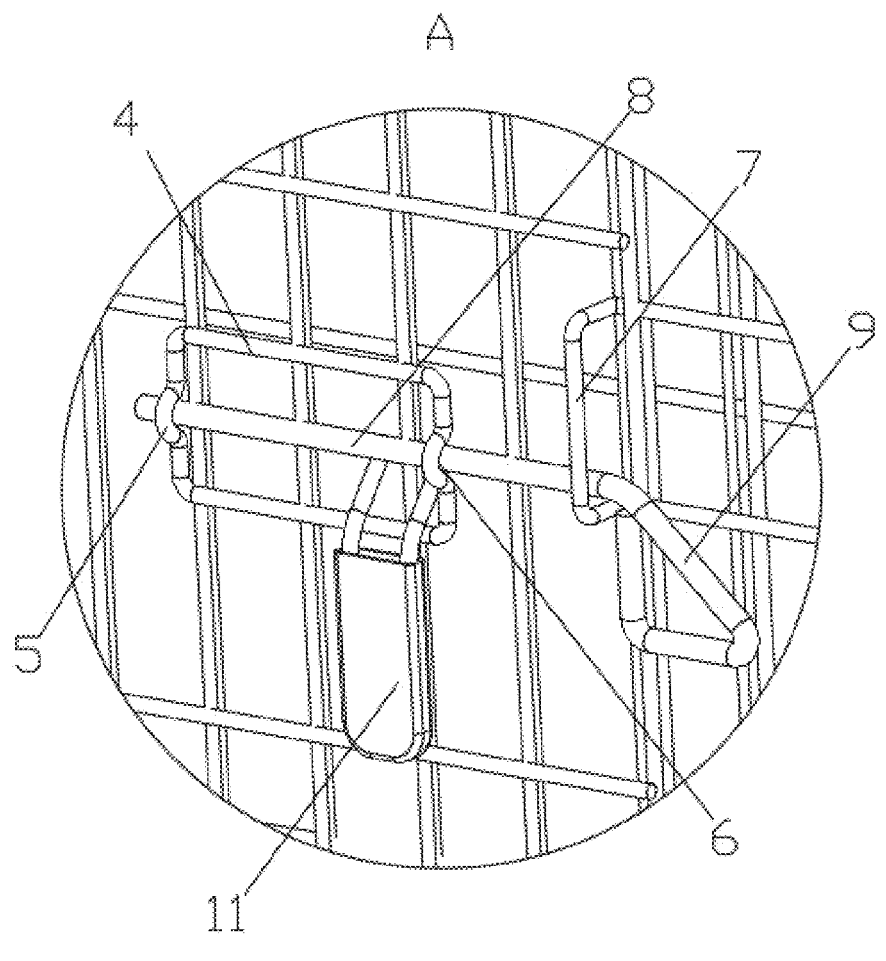
FIG. 3 is a schematic detail of A according to an embodiment of the present disclosure.
Figure 4:
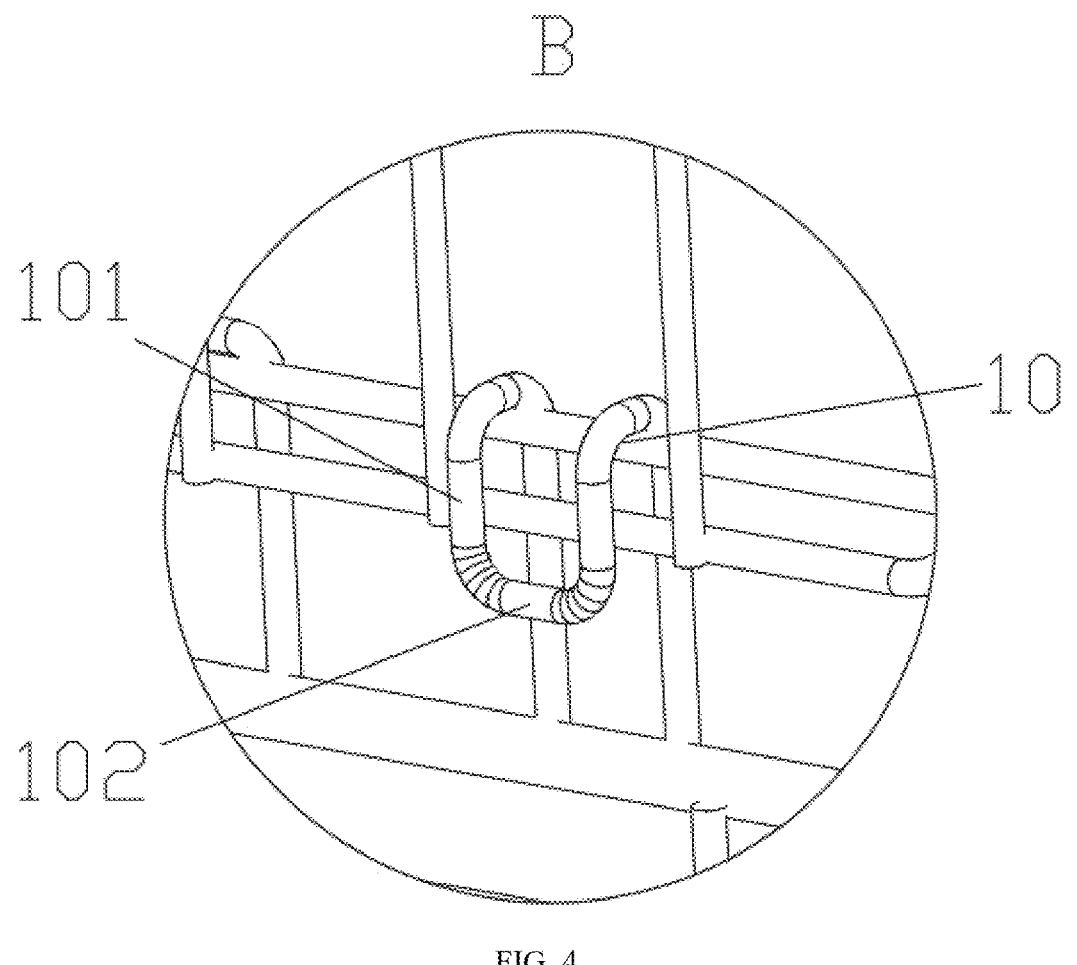
FIG. 4 is a schematic detail of B according to an embodiment of the present disclosure.

As shown in FIGS. 1 to 3, in an embodiment of the present disclosure, a handle 118 is fixedly connected to the rotating rod.

The handle 11 is fixedly connected to the rotating rod 8, allowing the operator to rotate the rotating rod 8 by rotating the handle 11, reducing the difficulty of operation by the operator. The present disclosure has the following advantages: The present disclosure has the following advantages:

1. When the locking assembly is in a locking state, the pet cannot rotate the locking assembly 180 degrees, and thus cannot open the locking assembly, avoiding the pet from opening the door body 3 and escaping out.
2. The locking assembly is easy to operate, and only two simple steps are needed to open and close the door body 3.
3. The second locking members 10 cooperate with the locking assembly to achieve dual locking and can disperse the impact force on the locking assembly, reducing damage to the locking assembly.

In the present disclosure, the terms such as "provided", "connected to", "connected", and "fixed" should be comprehended in a broad sense. For example, "connected" may be comprehended as fixedly connected, detachably connected, or integrally connected, and "connected to" may be directly connected to or indirectly connected to through an intermediary. Those of ordinary skill in the art may understand the specific meanings of the above terms in the present disclosure based on specific situations.

In the description of the present disclosure, it should be understood that orientation or position relationships indicated by terms such as "inside" and "outside" are orientation or position relationships shown in the drawings, and these terms are just used to facilitate description of the present disclosure and simplify the description, but not to indicate or imply that the mentioned apparatus or elements must have a specific orientation and must be constructed and operated in a specific orientation, and thus, these terms cannot be understood as a limitation to the present disclosure.

In the description of this specification, the description with reference to the terms such as "one embodiment", "some embodiments", and "a specific embodiment" means that the specific features, structures, materials, or characteristics described with reference to the embodiment or example are included in at least one embodiment or example of the present disclosure. In this specification, the schematic descriptions of the above terms do not necessarily refer to the same embodiment or example. Moreover, the specific features, structures, materials, or characteristics described may be combined in any suitable manner in any one or more embodiments or examples.

The above are merely preferred embodiments of the present disclosure, and are not intended to limit the present disclosure, and various changes and modifications can be made by those skilled in the art to the present disclosure. Any modifications, equivalent substitutions, improvements, etc. made within the spirit and principle of the present disclosure should be included in the protection scope of the present disclosure.

What is claimed is:

1. A door lock for a pet crate, comprising:

a crate body, provided with an opening;

a door body, comprising a first end rotatably connected to a first side of the opening; and a locking assembly, provided at a second end of the door body and connected to the crate body, the locking assembly comprising a rotating rod carried by the door body and arranged to cooperate with a limiting member fixed to the crate body, the rotating rod having a first locking member configured to cam against the limiting member such that lateral movement of the rotating rod raises the door body relative to the crate body.

2. The door lock according to claim 1, wherein the locking assembly further comprises:

a fixed member, fixedly connected to the door body, wherein the fixed member is provided with protrusions; and gaps are formed between the protrusions and the door body;

the limiting member, fixedly connected to the crate body, wherein the limiting member is provided at a second side of the opening away from a connection between the door body and the crate body;

the rotating rod, rotatably connected inside the gaps and the limiting member; and the first locking member, fixedly connected to an end of the rotating rod, wherein the first locking member is provided at a side of the limiting member away from the fixed member.

3. The door lock according to claim 2, further comprising:

second locking members, fixedly connected to the crate body, wherein the second locking members are located above and below the opening.

4. The door lock according to claim 3, wherein the first locking member is triangular in shape.

5. The door lock according to claim 3, wherein the second locking members each comprise two U-shaped rods; the two U-shaped rods each comprise a first end fixedly connected inside the crate body and a second end located outside the crate body; and a connecting rod is fixedly connected between the two U-shaped rods outside the crate body.

6. The door lock according to claim 2, wherein a handle is fixedly connected to the rotating rod.

7. The door lock according to claim 2, wherein the limiting member is U-shaped; and two ends of the limiting member are fixedly connected to the crate body.

* * * * *